United States Patent [19]

Carbrey

[11] 3,823,271

[45] July 9, 1974

[54] POLARITY REVERSAL CIRCUIT

[75] Inventor: Robert Lawrence Carbrey, Boulder, Colo.

[73] Assignee: Bell Telephone Laboratories, Incorporated, Murray Hill, N.J.

[22] Filed: May 2, 1973

[21] Appl. No.: 356,318

[52] U.S. Cl. .............. 179/86, 179/18 AH, 307/262, 307/247 R

[51] Int. Cl. .......................................... H03k 17/00

[58] Field of Search ........... 179/1 SW, 18 F, 18 AD, 179/18 AF, 18 AH, 18 FA, 18 GF, 18 HA, 6.3 R; 307/257, 250, 247 R, 262

[56] References Cited

UNITED STATES PATENTS

| | | | |
|---|---|---|---|
| 3,247,323 | 4/1966 | Carroll | 307/250 |
| 3,700,827 | 10/1972 | Dalley | 307/257 |
| 3,700,926 | 10/1972 | Dalley | 307/257 |

*Primary Examiner*—Kathleen H. Claffy
*Assistant Examiner*—Joseph A. Popek
*Attorney, Agent, or Firm*—J. S. Cubert

[57] ABSTRACT

In a telephone type system wherein battery reversal signalling is employed, a polarity reversal circuit utilizing an emitter follower bistable is connected between an electronic exchange circuit and a trunk. The bistable is operative responsive to a sequence of momentary control signals to reverse the voltage polarity at the trunk for signaling purposes while leaving the voltage polarity at the exchange invariant for proper operation of electronic output devices such as transistors in the exchange circuit. In either state, the bistable provides a voice signal path from the exchange circuit to the trunk.

9 Claims, 1 Drawing Figure

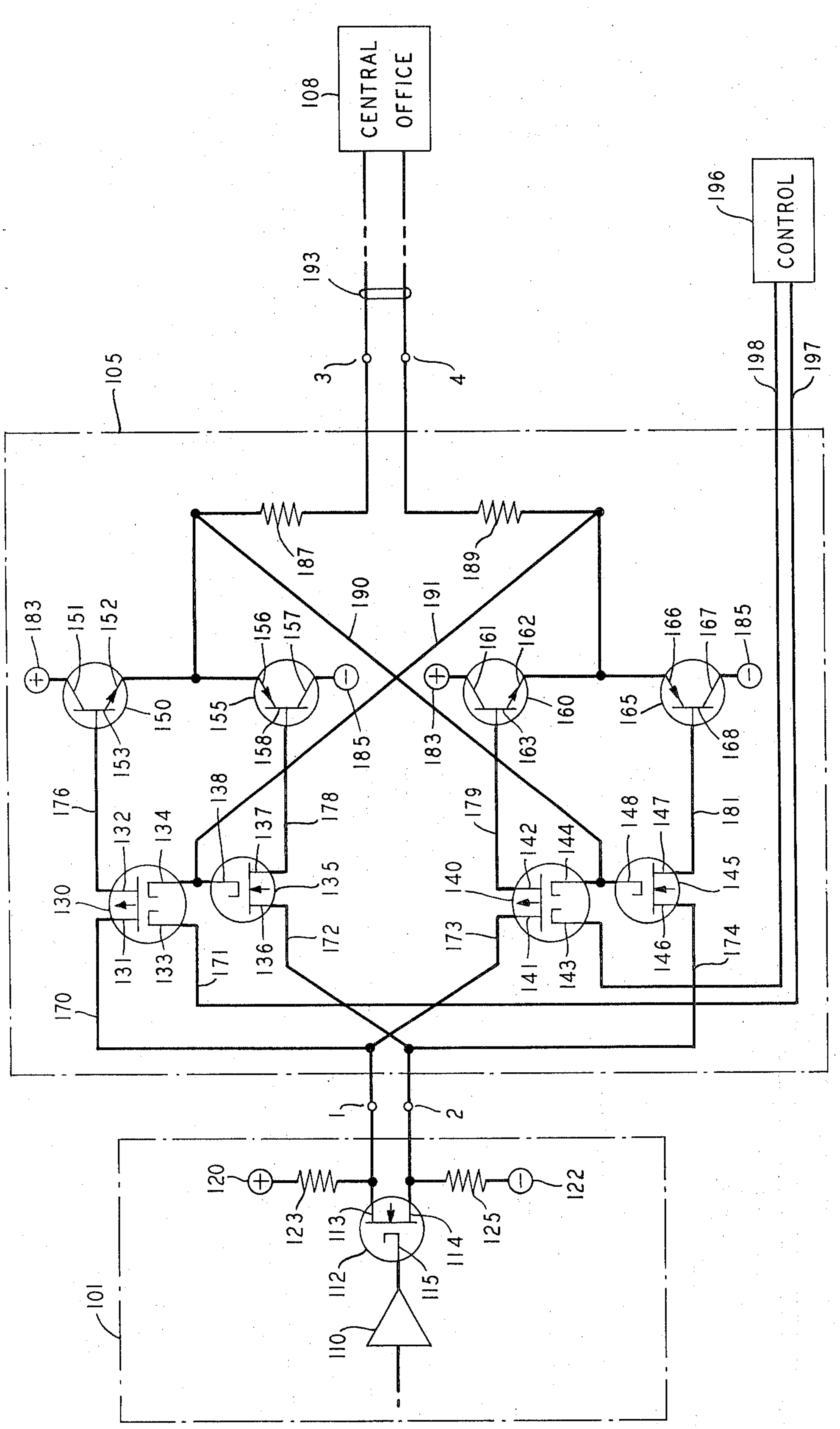
CENTRAL OFFICE
CONTROL

POLARITY REVERSAL CIRCUIT

BACKGROUND OF THE INVENTION

This invention relates to signaling arrangements in communication systems and more particularly to polarity reversal signaling in telephone systems having electronic circuits.

In telephone and other communication systems, it is common to interconnect an exchange such as a private branch exchange to a central office through a trunk. The trunk is operative to transmit voice or other intelligence between the exchange and the connected central office and also to transmit signaling information to the trunk pertaining to the call connection. One form of signaling termed "reverse battery signaling" may be utilized in such connections to a central office. In this form of signaling, the potentials on the tip and ring conductors of the trunk connected between the exchange and the central office are reversed responsive to control signals. This arrangement is generally used to delay forwarding of the dialed station member until a dial pulse register is assigned and to indicate answering by a called party but is also useful for other signaling purposes. In exchange circuits using devices insensitive to potential reversals such as relays or transformers, battery reversal signaling presents no problems. Where, however, electronic devices such as transistors in the exchange are connected directly to the trunk, the reversal of voltage polarity may render the device inoperative. If the battery reversal signal originates at the central office termination of the trunk, relay devices thereat may be used to reverse potential and a diode rectifier bridge may be inserted between the exchange terminal of the trunk and the exchange electronic circuit so that proper operation of electronic devices can be obtained. There are some signaling arrangements, however, in which the reversal signaling originates at the exchange terminal of the trunk. In such arrangements, a diode rectifier bridge is not effective to provide the proper potentials for the exchange electronic device during the reversal of potential on the connected tip and ring conductors.

BRIEF SUMMARY OF THE INVENTION

The invention is a polarity reversal circuit having first and second terminals connected to an electronic circuit and third and fourth terminals connected to a trunk. The reversal circuit is adapted to provide a reversible voltage polarity at the trunk for signaling purposes while leaving the voltage polarity at the electronic circuit invariant and to further provide an information path from the electronic circuit to the trunk.

The reversal circuit comprises a first voltage source and a second voltage source which are selectively coupled to the third and fourth terminals responsive to first and second momentary control signals and first, second, third and fourth coupling devices interconnected through associated switches to form a bistable configuration. In one state of bistable responsive to the first control signal, the first and fourth coupling devices conduct. The first coupling device couples the first voltage to the third terminal and the fourth coupling device couples the second voltage to the fourth terminal. In the other state of the bistable responsive to the second control signal, the second and third coupling devices conduct. The second coupling device couples the second voltage to the third terminal and the third coupling device couples the first voltage to the fourth terminal. The associated switches maintain the selected state of the bistable and couple the information signals from the first and second terminals through the conducting coupling devices so that the information signals are transmitted to the third and fourth terminals in either state.

Each coupling device has first, second and control electrodes. The first and third coupling device first electrodes are connected to the first voltage source while the second and fourth coupling device first electrodes are connected to the second voltage source. The first and second coupling device second electrodes are connected to the third terminal and the third and fourth coupling device second electrodes are connected to the fourth terminal. The control electrodes of the first and third coupling devices are connected to the first terminal through first and third switches, respectively, and the control electrodes of the second and fourth coupling devices are connected to the second terminal through second and fourth switches, respectively.

Responsive to the first momentary control signal, the third switch, third coupling device, second switch and second coupling device are turned off; and the first switch, first coupling device, fourth switch and fourth coupling device are turned on whereby the first voltage is applied to the third terminal through the first coupling device and the second voltage is applied to the fourth terminal through the fourth coupling device. Responsive to the second momentary control signal, the first switch, first coupling device, fourth switch and fourth coupling device are turned off; and the third switch, third coupling device, second switch and second coupling device are turned on whereby the first voltage is applied to the fourth terminal via the third coupling device and the second voltage is applied to the third terminal via the second coupling device.

According to one aspect of the invention, the first voltage source comprises a positive voltage source and the second voltage source comprises a negative voltage source.

According to another aspect of the invention, each coupling device comprises a transistor having collector, emitter and base electrodes. The first and third transistor collectors are connected to the positive voltage source and the second and fourth transistor collectors are connected to the negative voltage source. The first and second transistor emitters are connected to the third terminal and the third and fourth transistor emitters are connected to the fourth terminal. The first and third transistor bases are connected to the first terminal through the first and third switches, respectively, and the second and fourth transistor bases are connected to the second terminal through the second and fourth switches, respectively.

According to another aspect of the invention, each switch comprises an Insulated Gate Field Effect Transistor (IGFET), having source, drain and control electrodes. The first and third IGFET drains are connected to the first terminal and the second and fourth IGFET drains are connected to the second terminal. The first IGFET source is connected to the first transistor base and the third IGFET source is connected to the third transistor base. The second IGFET source is connected to the second transistor base and the fourth IGFET source is connected to the fourth transistor base. The first IGFET has two control electrodes, one being connected to the third and fourth transistor emitters and the other being connected to the control signal source. The third IGFET has two control electrodes, one being connected to the first and second transistor emitters and the other being connected to the control signal source. The second IGFET has a control electrode connected to the third and fourth transistor emitters and the fourth IGFET has a control electrode connected to the first and second transistor emitters.

DESCRIPTION OF THE DRAWING

The drawing depicts a schematic diagram of an embodiment illustrative of the invention.

DETAILED DESCRIPTION

The drawing shows a polarity reversal switching circuit 105 connected to exchange circuit 101 via terminals 1 and 2 and further connected to central office 108 via terminals 3 and 4 and trunk 193. Exchange circuit 101 may be part of a private branch exchange. The exchange circuit is shown in part and includes amplifier 110 which applies a signal from the exchange to n-type insulated gate field effect transistor (IGFET) 112. IGFET 112 comprises drain 113, source 114 and gate 115 and is biased to operate in its linear range by positive voltage source 120 via impedance 123 which is connected to drain 113 and negative source 122 which is connected to source 114 via impedance 125. The signal from amplifier 110 is applied to gate 115; and, as is well known in the art, one output signal appears on drain 113 while the opposite phase output signal appears on source 114. It is to be understood that electronic devices other than IGFETs may be used in place of IGFET 112.

The output signals from IGFET 112 are applied to trunk 193 via circuit 105. Circuit 105 is also operative to provide reverse polarity signaling to central office 108 via trunk 193 and comprises a bistable arrangement which is operative in one state to apply a positive voltage to terminal 3 and a negative voltage to terminal 4. Circuit 105 is operative in a second state to provide a negative voltage to terminal 3 and a positive voltage to terminal 4. The reversal of voltage polarity at terminals 3 and 4 is transmitted to the central office 108 via trunk 193 so that signaling of the central office is obtained. Since IGFET 112 in circuit 101 requires a predetermined voltage polarity on its drain and source, the voltages at terminals 1 and 2 must be invariant regardless of the polarity applied to the trunk and circuit 105 is arranged to prevent the polarity reversal at terminals 3 and 4 from affecting terminals 1 and 2.

Circuit 105 comprises NPN transistor 150, PNP transistor 155, NPN transistor 160 and PNP transistor 165. Collector 151 of transistor 150 is connected to positive voltage source 183, and emitter 152 of transistor 150 is connected to terminal 3 via resistor 187. When transistor 150 is conductive, the positive voltage from source 183 is coupled to terminal 3. Negative voltage source 185 is connected to collector 167 of transistor 165; and emitter 166 of transistor 165 is connected to terminal 4 via resistor 189. When transistor 165 is conductive, the negative voltage from source 185 is coupled to terminal 4. In this condition corresponding to one state of the bistable, a positive voltage appears at terminal 3 and a negative voltage appears at terminal 4.

PNP transistor 155 has its collector 157 connected to negative voltage source 185 and has its emitter 156 connected to terminal 3 via resistor 187. When this transistor is conductive, the negative voltage from source 185 is coupled to terminal 3. NPN transistor 160 has its collector 161 connected to positive source 183, and its emitter 162 connected to terminal 4 via resistor 189. When transistor 160 is conductive, the positive voltage from source 183 is coupled to terminal 4. When transistors 155 and 160 are conductive corresponding to the other state of the bistable, the voltage at terminal 3 is negative and the voltage at terminal 4 is positive and polarity reversal is obtained.

P-type IGFET 130 operates as a switch having its drain electrode 131 connected to terminal 1 and its source electrode 132 connected to base 153 of transistor 150. In response to negative going voltages applied concurrently to gates 133 and 134, IGFET 130 conducts and provides a positive voltage to base 153 from voltage source 120. P-type IGFET switch 140 has its drain electrode 141 connected to terminal 1 and its source electrode 142 connected to base 163 and is conductive responsive to negative going signals concurrently applied to gates 143 and 144 to provide a positive voltage to base 163 from voltage source 120 via terminal 1.

N-type IGFET switch 135 operates as a switch connected between terminal 2 and base 158. Its drain electrode 135 is connected to terminal 2 and its source electrode 137 is connected to base 158. In response to a positive going signal applied to gate 138, IGFET 135 is conductive so that a negative voltage is applied to base 158 from voltage source 122. N-type IGFET 145 operates as a switch between base 168 and terminal 2. Its drain electrode 146 is connected to terminal 2 and its source electrode 147 is connected to base 168. Responsive to a positive going voltage on gate 148, IGFET 145 is conductive so that a negative voltage from source 122 is applied to base 168. IGFETs 130, 135, 140 and 145 provide an interconnection network for transistors 150, 155, 160 and 165 whereby a bistable circuit is formed. These IGFETs are also effective when conductive to pass information signals from IGFET 112 to the bases of transistors 150, 155, 160 and 165, respectively.

Assume for purposes of illustration that circuit 105 is in its first state arranged so that a positive voltage appears on terminal 3 and a negative voltage appears at terminal 4. In this state, IGFET switch 130, transistor 150, transistor 165 and IGFET switch 145 are conductive. Switch 130 allows the positive voltage from source 120 to be applied to base 153 via resistor 123, lead 170 and lead 176. The positive voltage at base 153 is transmitted to emitter 152. As is well known in the art, transistor 150 operates as an emitter follower so that a positive voltage at base 153 causes transistor 150 to conduct and the positive voltage from source 183 is coupled to terminal 3 and lead 190. The positive voltage on lead 190 is applied to gates 144 and 148 so that n-type IGFET 145 is conductive but p-type IGFET 140 is turned off. In this way, base 168 is connected to negative voltage source 122 via lead 181, IGFET 145, lead 174 and impedance 125. The negative voltage at base 168 biases emitter follower transistor 165 to its conductive state whereby emitter electrode 166 becomes negative and the emitter-collector path of emitter follower transistor 165 becomes conductive. In this way, the negative voltage from source 185 is coupled to terminal 4 via resistor 189 and this negative voltage appears on lead 191. The negative voltage on lead 191 is transmitted to gates 134 and 138 so that p-type IGFET 130 is maintained in its conductive state and n-type IGFET 135 is turned off.

In the first bistable state, transistors 150 and 165 operate as emitter followers so that the signal voltage appearing at terminal 1 is applied to base 153 through conducting IGFET 130. This signal voltage is coupled by transistor 150 to terminal 3. In like manner, the signal voltage appearing at terminal 2 is applied to base 168 via conducting IGFET 145 and this signal voltage is applied from emitter 166 to terminal 4. Thus in its first state, circuit 105 is operative to transmit information signals from terminals 1 and 2 to terminals 3 and 4 and also provides a positive voltage on terminal 3 and a negative voltage on terminal 4.

When it is required to reverse the voltage polarity at terminals 3 and 4, a momentary positive going signal is sent from control 196 via lead 197 to gate 133 of conducting p-type IGFET 130. The momentary positive going voltage turns off IGFET 130 so that the voltage at base 153 is lowered. This in turn causes the voltage on lead 190 to be negative going. The negative going voltage on lead 190 is applied to gates 144 and 148 and causes n-type IGFET 145 to turn off but allows p-type IGFET 140 to conduct. At this time, the positive voltage from source 120 is applied to base 163 through IGFET 140 so that transistor 160 is conductive and the voltages at terminal 4 and lead 191 become positive. The positive voltage on lead 191 is applied to gates 134 and 138 whereby p-type IGFET switch 130 is maintained in its nonconductive state but n-type IGFET 135 is rendered conductive. The negative voltage from source 122 is applied to base 158 of transistor 155 through impedance 125, lead 172, conducting IGFET 135, and lead 178. Transistor 155 becomes conductive so that the negative voltage from source 185 is coupled to terminal 3 and lead 190. In this way, p-type IGFET switch 140 is maintained in its conductive state and n-type IGFET switch 145 remains turned off. Since transistors 160 and 155 are connected as emitter followers, the signal voltage at terminal 2 is coupled through IGFET 135 and transistor 155 to terminal 3 and the signal voltage at terminal 1 is coupled through IGFET 140 and transistor 160 to terminal 4.

In order to reverse the state of circuit 105, a momentary positive going voltage is applied from control 196 to gate 143 of p-type IGFET switch 140 via lead 198. This momentary positive voltage causes p-type IGFET switch 140 to be turned off whereby the voltage at base 163 is lowered. The resulting drop in voltage at emitter 162 is applied to gates 134 and 138 via lead 191. The drop in voltage turns off n-type IGFET 135 but permits p-type IGFET 130 to be conductive. In this way, the positive voltage from source 120 is applied through impedance 123, lead 170, IGFET switch 130 and lead 176 to base 153. The voltage at base 153 is increased and this increase in voltage appears on lead 190.

The increase in voltage on lead 190 is applied to gate 144 of p-type IGFET switch 140 and gate 148 of n-type IGFET switch 145 whereby p-type IGFET switch 140 is turned off and n-type IGFET switch 145 is turned on. The negative voltage from source 122 is now applied to base 168 through impedance 125, lead 174, conducting IGFET switch 145 and lead 181. Transistor 165 then becomes conductive and the negative voltage from source 185 is transmitted via the collector-emitter path of transistor 165 to lead 191 and terminal 4. The negative voltage on lead 191 is applied to gate 134 of p-type IGFET switch 130 and gate 138 of n-type IGFET switch 135 so that IGFET switch 135 is turned off and IGFET switch 130 is maintained in its conductive state. In this state of the bistable circuit, transistor 150 is conductive and positive voltage from source 183 is coupled through the collector-emitter path of transistor 150 to terminal 3. Transistor 165 is also conductive so that the negative voltage from source 185 is coupled through the collector-emitter path of transistor 165 to terminal 4. Thus, an alternating sequence of momentary control signals from control 196 causes the voltage polarity on terminals 3 and 4 to reverse for a predetermined period whereby a signal is transmitted to central office 108.

What is claimed is:

1. A polarity reversal circuit for transferring signals between first and second terminals and third and fourth terminals and for selectively reversing polarity across said third and fourth terminals comprising a first voltage source, a second voltage source, means for generating first and second momentary control signals, first, second, third and fourth coupling devices each having first, second and control electrodes, means for interconnecting said first, second, third and fourth coupling devices to form a bistable circuit connected between said first and second and third and fourth terminals, said first and third coupling device first electrodes being connected to said first voltage source, said second and fourth coupling device first electrodes being connected to said second voltage source, means for connecting said first and second coupling device second electrodes to said third terminal, means for connecting said second and fourth coupling device second electrodes to said fourth terminal, the control electrodes of said coupling devices being connected to said interconnecting means, said interconnecting means being responsive to said first control signal for rendering said first and fourth coupling devices conductive to couple the first voltage from said first voltage source to said third terminal via said first coupling device and to couple the second voltage from said second voltage source to said fourth terminal via said fourth coupling device, and said interconnecting means being responsive to said second control signal for rendering said second and third coupling devices conductive to couple said second voltage from said second voltage source to said third terminal via said second coupling device and to couple said first voltage from said first voltage source to said fourth terminal via said third coupling device.

2. A polarity reversal circuit for transferring signals between first and second terminals and third and fourth terminals and for selectively reversing polarity across third and fourth terminals according to claim 1 wherein said interconnecting means comprises a first switching device connected between said first terminal and said first coupling device control electrode and having first and second control electrodes, a second switching device connected between said second terminal and said second coupling device control electrode and having a control electrode, a third switching device connected between said first terminal and said third coupling device control electrode and having first and second control electrodes, a fourth switching device connected between said second terminal and said fourth coupling device control electrode and having a control electrode, means for coupling said first and second coupling device second electrodes to the first control electrode of said third switching device and the control electrode of said fourth switching device, means for coupling said third and fourth coupling device second electrodes to the first control electrode of said first switching device and the control electrode of said second switching device, means for applying said first control signal to the second control electrode of said third switching device, and means for applying said second control signal to the second control electrode of said first switching device.

3. A polarity reversal circuit for transferring signals between first and second terminals and third and fourth terminals and for selectively reversing polarity across said third and fourth terminals according to claim 2 wherein each of said first, second, third and fourth coupling devices comprises a transistor having collector, emitter and base electrodes, said transistor collector corresponding to said coupling device first electrode, said transistor emitter corresponding to said coupling device second electrode and said transistor base corresponding to said coupling device control electrode.

4. A polarity reversal circuit for transferring signals between first and second terminals and third and fourth terminals and for selectively reversing polarity across said third and fourth terminals according to claim 3 wherein each of said first, second, third and fourth switching devices comprises an insulated gate field effect transistor (IGFET) having source, drain and gate electrodes, said first and third IGFET drains being connected to said first terminal, said second and fourth IGFET drains being connected to said second terminal, said first IGFET source being connected to said first transistor base, said second IGFET source being connected to said second transistor base, said third IGFET source being connected to said third transistor base, said fourth IGFET source being connected to said fourth transistor base, said first and third switching device first control electrodes corresponding to said first and third IGFET first gates and said second and fourth switching device control electrodes corresponding to said second and fourth IGFET gates.

5. A polarity reversal circuit for transferring signals between first and second terminals and third and fourth terminals and for selectively reversing polarity across said third and fourth terminals according to claim 4 wherein said first voltage source comprises a positive voltage source and said second voltage source comprises a negative voltage source.

6. A polarity reversal circuit for transferring signals between first and second terminals and third and fourth terminals and for selectively reversing polarity across said third and fourth terminals according to claim 4 wherein said first voltage source comprises a ground reference source and said second voltage source comprises a negative battery.

7. A polarity reversal signaling circuit comprising first and second terminals connected to an electronic trunk circuit and third and fourth terminals connected to a trunk, a positive voltage source, a negative voltage source, means for generating first and second momentary control signals, and a bistable switching circuit connected between said first and second terminals and said third and fourth terminals operative in a first state responsive to said first control signal to apply a positive voltage to said third terminal and a negative voltage to said fourth terminal and operative in a second state responsive to said second control signal to apply a negative voltage to said third terminal and a positive voltage to said fourth terminal and operative in both states to transfer information from said first and second terminals to said third and fourth terminals, said bistable circuit comprising first, second, third and fourth transistors, each having a collector, an emitter and a base, said first and third transistor collectors being connected to said positive voltage source, said second and fourth transistor collectors being connected to said negative voltage source, said first and second transistor emitters being connected to said third terminal, said second and fourth transistor emitters being connected to said fourth terminal, first, second, third and fourth IGFET switches each having source, drain and gate electrodes, said first and third IGFET switch drains being connected to said first terminal, said first IGFET source being connected to said first transistor base, said third IGFET source being connected to said third transistor base, said second and fourth IGFET drains being connected to said second terminal, said second IGFET source being connected to said second transistor base, said fourth IGFET source being connected to said fourth transistor base, means for connecting said first and second transistor emitters to one gate of said third IGFET switch and to the gate of said fourth IGFET switch, means for connecting said third and fourth transistor emitters to one gate of said first IGFET switch and to the gate of said second IGFET switch, means for applying said first control signal to the other gate of said third IGFET switch to put said bistable circuit in its first state, and means for applying said second control signal to the other gate of said first IGFET switch to put said bistable circuit in its second state.

8. A polarity reversal signaling circuit according to claim 7 wherein said first and third transistors comprise NPN transistors, said third and fourth transistors comprise PNP transistors, said first and third IGFET switches comprise p-type IGFETs and said third and fourth IGFET switches comprise n-type IGFETs.

9. A polarity reversal circuit for transferring signals between first and second terminals and third and fourth terminals and for selectively reversing voltage polarity across said third and fourth terminals, comprising a first voltage source, a second voltage source, means for generating first and second control signals, and a bistable circuit connected between said first and second terminals and said third and fourth terminals, said bistable circuit comprising first, second, third and fourth coupling devices and a switching network interconnecting said first, second, third and fourth coupling devices, said bistable circuit being responsive to said first control signal for coupling said first voltage to said third terminal via said first coupling device and for coupling said second voltage to said fourth terminal via said fourth coupling device, said bistable circuit being responsive to said second control signal for coupling said first voltage to said fourth terminal via said third coupling device and for coupling said second voltage to said third terminal via said second coupling device.

* * * * *

UNITED STATES PATENT OFFICE

CERTIFICATE OF CORRECTION

PATENT NO. : 3,823,271

DATED : July 9, 1974

INVENTOR(S) : Robert L. Carbrey

It is certified that error appears in the above-identified patent and that said Letters Patent are hereby corrected as shown below:

Column 6, line 36, cancel "second" first occurrence, and insert -- third --.

Signed and Sealed this

*seventh* Day of *October 1975*

[SEAL]

*Attest:*

RUTH C. MASON
*Attesting Officer*

C. MARSHALL DANN
*Commissioner of Patents and Trademarks*